United States Patent
Nonaka

(10) Patent No.: US 11,904,640 B2
(45) Date of Patent: Feb. 20, 2024

(54) PNEUMATIC TYRE

(71) Applicant: Sumitomo Rubber Industries, Ltd., Kobe (JP)

(72) Inventor: Kenji Nonaka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 493 days.

(21) Appl. No.: 17/092,990

(22) Filed: Nov. 9, 2020

(65) Prior Publication Data

US 2021/0155058 A1    May 27, 2021

(30) Foreign Application Priority Data

Nov. 26, 2019  (JP) .................... 2019-213473

(51) Int. Cl.
| | |
|---|---|
| *B60C 5/14* | (2006.01) |
| *B60C 15/02* | (2006.01) |
| *B60C 15/024* | (2006.01) |
| *B60C 15/06* | (2006.01) |
| *B60C 15/04* | (2006.01) |

(52) U.S. Cl.
CPC .............. *B60C 15/04* (2013.01); *B60C 5/14* (2013.01); *B60C 15/024* (2013.01); *B60C 2015/0614* (2013.01); *B60C 2200/10* (2013.01)

(58) Field of Classification Search
CPC ........................ B60C 5/14; B60C 2005/145
See application file for complete search history.

(56) References Cited

U.S. PATENT DOCUMENTS

| | | | | |
|---|---|---|---|---|
| 5,769,981 | A | * | 6/1998 | Turley ................. B60C 15/024 152/544 |
| 6,073,669 | A | | 6/2000 | Takada et al. |
| 2001/0017180 | A1 | * | 8/2001 | Mori .................... B60C 15/024 152/546 |
| 2002/0189739 | A1 | | 12/2002 | Koya et al. |
| 2011/0284143 | A1 | | 11/2011 | Horiuchi |

(Continued)

FOREIGN PATENT DOCUMENTS

| | | |
|---|---|---|
| EP | 0 749 855 A1 | 12/1996 |
| EP | 2 228 238 A1 | 9/2010 |

(Continued)

OTHER PUBLICATIONS

Machine Translation: JP-11192821-A, Fujiwara K, (Year: 2023).*
Extended European Search Report for European Application No. 20202841.1, dated Apr. 14, 2021.

*Primary Examiner* — Kendra Ly
(74) *Attorney, Agent, or Firm* — Birch, Stewart, Kolasch & Birch, LLP

(57) ABSTRACT

A pneumatic tyre includes a pair of bead portions having respective bead cores therein, each bead core defining a core innermost end in a tyre radial direction, and an inner liner having an air-impermeable property and extending between the pair of bead portions, wherein in each of the pair of bead portions, the inner liner comprises an innermost end in the tyre radial direction located inwardly of the core innermost ends in the tyre radial direction, and the pair of bead portions has a bead base diameter being less than 99.7% of a rim diameter of a standard wheel rim on which the pneumatic tyre is to be mounted.

12 Claims, 3 Drawing Sheets

(56) References Cited

U.S. PATENT DOCUMENTS

2012/0145299 A1* 6/2012 Hino ..................... B60C 13/02
                                                         152/516
2017/0106704 A1* 4/2017 Osawa ............... B60C 15/0635
2018/0134097 A1* 5/2018 Isaka ..................... B60C 15/06
2019/0248184 A1* 8/2019 Guillaumain ........... D02G 3/26

FOREIGN PATENT DOCUMENTS

| JP | 11192821 A | * | 7/1999 |
| JP | 2017-74834 A | | 4/2017 |
| WO | WO 2005/044596 A1 | | 5/2005 |

\* cited by examiner

PNEUMATIC TYRE

BACKGROUND ART

Field of the Disclosure

The present disclosure relates to a pneumatic tyre.

Description of the Related Art

The following Patent document 1 discloses a pneumatic tyre comprising a pair of bead portions having respective bead cores therein, a carcass extending between the bead cores, and an inner disposed inside the carcass in the tyre radial direction.

PATENT DOCUMENT

[Patent document 1] Japanese Unexamined Patent Application Publication 2017-74834

SUMMARY OF THE DISCLOSURE

Unfortunately, in the pneumatic tyre of Patent Document 1, there is room for improvement in maintaining the tyre air pressure for a long period of time (hereinafter simply referred to as "air leak resistance").

The present disclosure has been made in view of the above circumstances and has a main object to provide a pneumatic tyre capable of improving air leak resistance.

In one aspect of the disclosure, a pneumatic tyre includes a pair of bead portions having respective bead cores therein, each bead core defining a core innermost end in a tyre radial direction, and an inner liner having an air-impermeable property and extending between the pair of bead portions, wherein in each of the pair of bead portions, the inner liner includes an innermost end in the tyre radial direction located inwardly of the core innermost ends in the tyre radial direction, and the pair of bead portions has a bead base diameter being less than 99.7% of a rim diameter of a standard wheel rim on which the pneumatic tyre is to be mounted.

In another aspect of the disclosure, in at least one of the pair of bead portions, the inner liner may include a first extension member that extends outwardly in the tyre axial direction through inwardly of the bead core in the tyre radial direction.

In another aspect of the disclosure, the bead core defines a core outermost end in the tyre axial direction, and the first extension member of the inner liner may extend beyond the core outermost end outwardly in the tyre axial direction.

In another aspect of the disclosure, the inner liner may include a second extension member that extends outwardly in the tyre radial direction from the first extension member.

In another aspect of the disclosure, an outermost end in the tyre radial direction of the second extension member of the inner liner may be located outwardly in the tyre radial direction of a bead base line.

In another aspect of the disclosure, the tyre further includes a carcass ply, wherein the carcass ply may include a main portion extending between the bead cores of the pair of bead portions, and a pair of turn-up portions turned up around the respective bead cores from axially inside to outside of the tyre, in each of the pair of bead portions, a ratio W/Wa may be equal to or more than 1.20, where "W" represents a maximum thickness in the tyre axial direction of the bead portion, and "Wa" represents a carcass thickness from an inner surface in the tyre axial direction of the main portion to an outer surface in the tyre axial direction of the turn-up portion at a middle-height position of the bead core in the tyre radial direction.

In another aspect of the disclosure, in each of the pair of bead portions, a ratio W/Wb may be greater than 4.50, where "Wb" represents an axial thickness in the tyre axial direction from the outer surface of the turn-up portion to an outer surface of the bead portion at the middle-height position.

In another aspect of the disclosure, a thickness in the tyre radial direction at a middle-width position of the bead core in the tyre axial direction from an inner surface in the tyre radial direction of the turn-up portion to an inner surface of the bead portion in the tyre radial direction may be in a range of 2 to 5 mm.

In another aspect of the disclosure, the pair of bead portions may each include a protrusion protruding outwardly from a bead reference surface, and the protrusion may be located outwardly in the tyre axial direction of a middle-width position of the bead core in the tyre axial direction and inwardly in the tyre radial direction of a middle-height position of the bead core in the tyre radial direction.

In another aspect of the disclosure, the protrusion may be located inwardly in the tyre radial direction of the core innermost end and outwardly in the tyre axial direction of a core outermost end of the bead core in the tyre axial direction.

In another aspect of the disclosure, the tyre may be a motorcycle tyre that has a tread width in the tyre axial direction corresponding to a tyre maximum width.

DESCRIPTION OF THE PREFERRED EMBODIMENTS

An embodiment of the present disclosure will be explained below with reference to the accompanying drawings.

Figure 1:
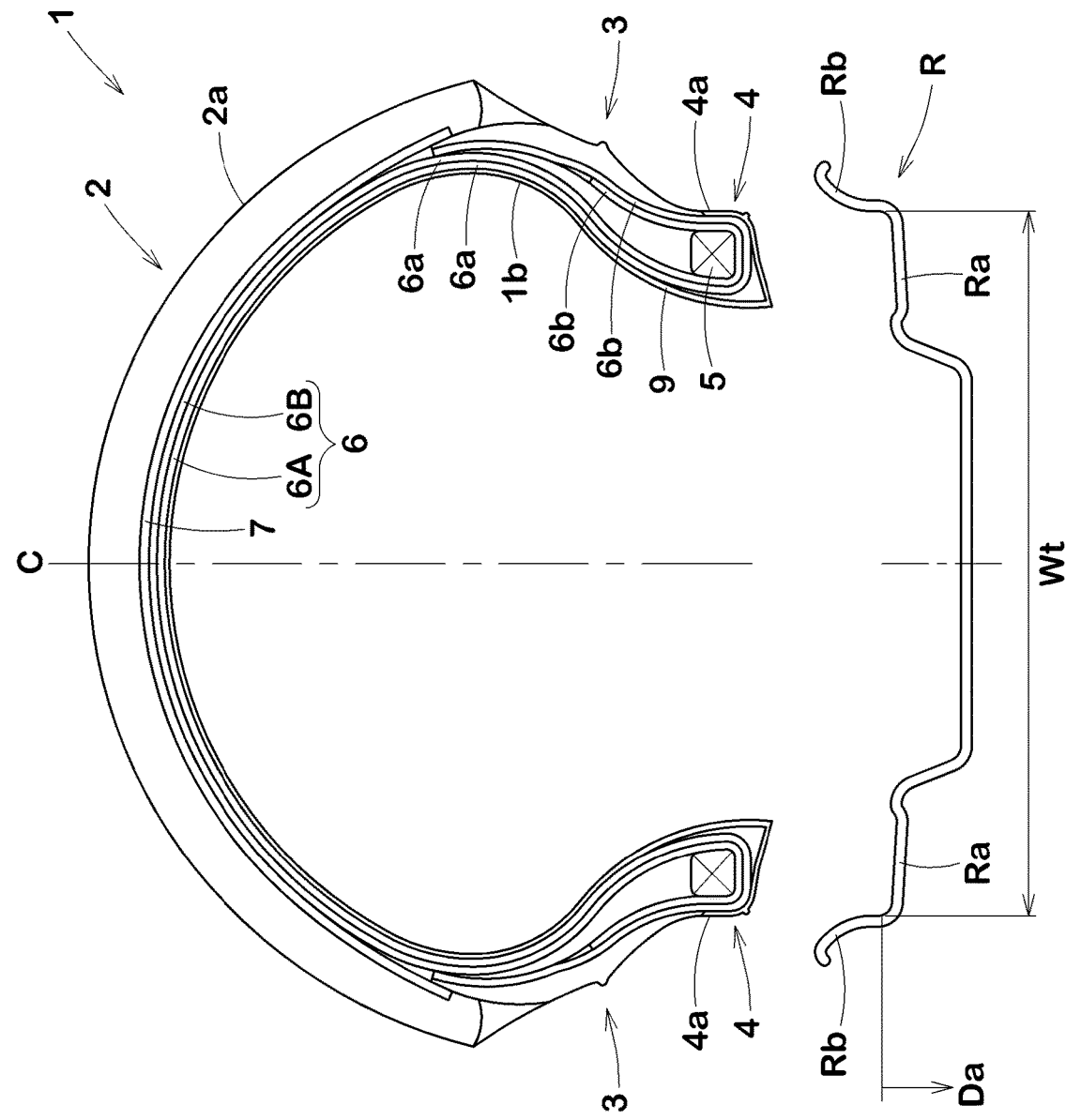
FIG. 1 is a cross-sectional view of a pneumatic tyre according to an embodiment of the disclosure.

FIG. 1 is a cross-sectional view of a pneumatic tyre (hereinafter simply referred to as "tyre") 1 under a non-rim-assembled state according to an embodiment of the disclosure. The cross-sectional view of FIG. 1 is a cross sectional view including the tyre axis (not illustrated) of the tyre 1. In the preferred embodiment, a motorcycle tyre is illustrated. Note that the tyre 1 according to the disclosure is not limited to a motorcycle tyre, but can be embodied as passenger car and heavy-duty vehicle tyres.

The tyre 1, for example, includes a tread portion 2 having a ground contact surface 2a, a pair of sidewall portions 3 extending inwardly in the tyre radial direction from respective ends of the tread portion 2, and a pair of bead portions 4 connected to the respective sidewall portions 3. In each bead portion 4, a bead core 5 is disposed.

As used herein, the "non-rim-assembled state" is defined as a state in which the bead portions 4 are held in such a manner that a distance in the tyre axial direction between bead outer surfaces 4a is equal to a rim width Wt of a standard wheel rim R. Note that the bead outer surfaces 4a are outer surfaces of the respective bead portions 4 which are located outwardly in the tyre axial direction of the bead cores 5 and are in contact with the standard wheel rim R.

Hereinafter, unless otherwise noted, dimensions of the tyre 1 are measured in this non-rim-assembled condition.

As used herein, the "standard wheel rim" R is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example. Hereinafter, the standard wheel rim R may simply refer to as "rim".

The rim according to the present embodiment includes a pair of rim seats Ra, and a pair of flanges Rb connected to the pair of rim seats Ra and extending outwardly in a wheel radial direction.

In the present embodiment, the ground contact surface 2a of the tread portion 2 has a circular arc shaped profile that is convex outwardly in the tyre radial direction in order to obtain a sufficient ground contact area even in cornering with large camber angles.

The tyre according to the present embodiment further includes a carcass 6 extending between the bead cores 5, and a belt layer 7 disposed radially outwardly of the carcass 6 in the tread portion 2. As to the bead cores 5 and the belt layer 7, conventional structures may appropriately be adopted.

The carcass 6 includes at least one carcass ply. In the present embodiment, two carcass plies 6A and 6B which are superimposed in the tyre radial direction are employed. The carcass plies 6A and 6B, for example, each include carcass cords that are oriented at an angle of from 75 to 90 degrees with respect to the tyre equator C and topping rubber (not illustrated) that coats the carcass cords.

Each of the carcass plies 6A and 6B, for example, includes a main portion 6a and a pair of turn-up portions 6b. The main portion 6a, for example, extending between the bead cores 5 of the bead portions 4 in a toroidal manner. The turn-up portions 6b, for example, are turned up around the respective bead cores 5 from inside to outside of the tyre in the tyre axial direction. The turn-up portions 6b, for example, extend outwardly in the tyre radial direction of the bead cores 5.

The tyre 1 according to the present embodiment further includes an inner liner 9 having an air-impermeable property and extending between the pair of bead portions 4. The inner liner 9, for example, forms a cavity surface 1b of the tyre 1. The inner liner 9, in the present embodiment, is formed from an elastomer composition containing a styrene-isobutylene-styrene block copolymer.

Figure 2:
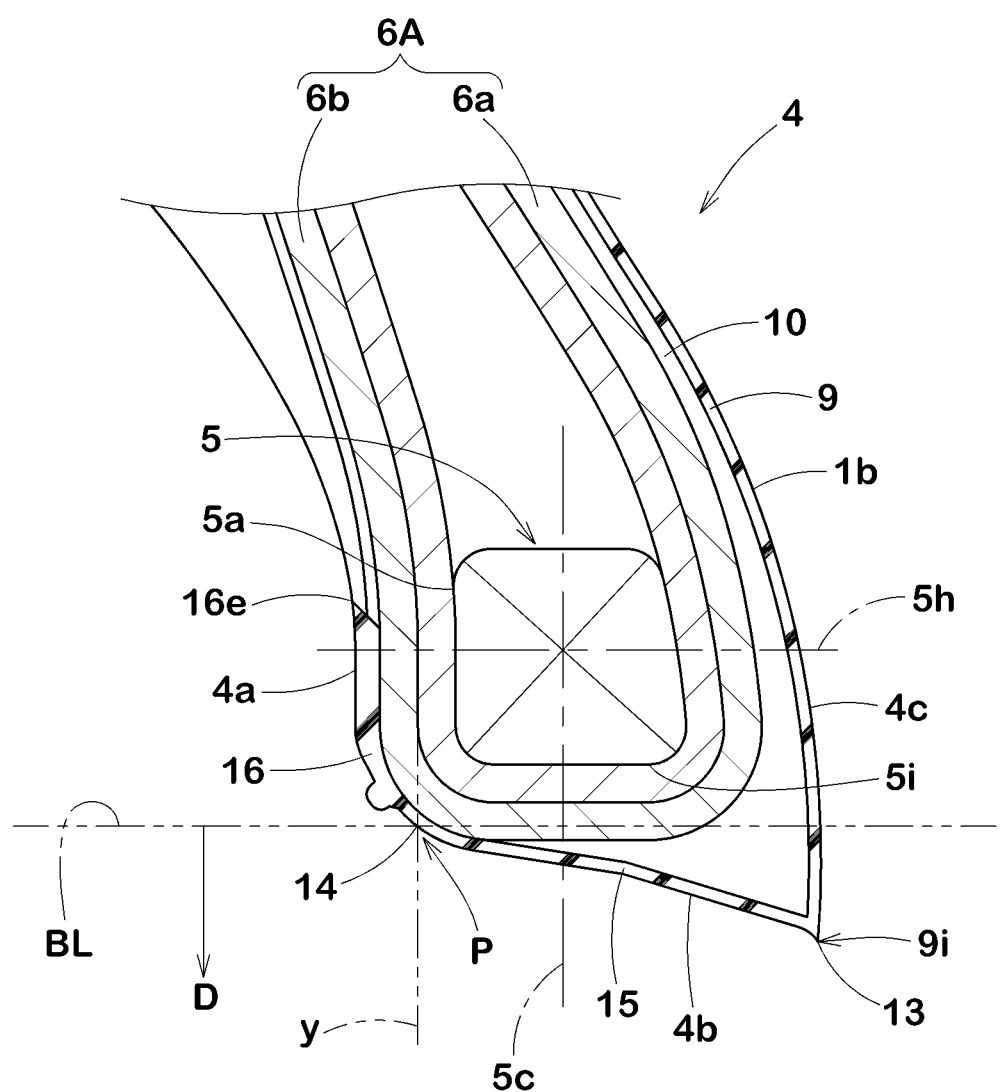
FIGS. 2 and 3 are enlarged views of a left-side bead portion of FIG. 1.

FIG. 2 illustrates an enlarged view of the left-side bead portion 4. Although the right-side bead portion 4 is not illustrated, it can be configured the same structure as the left-side bead portion 4. As illustrated in FIG. 2, the inner liner 9, for example, is joined the main portion 6a of the carcass 6 through a tie gum layer 10. As to the tie gum layer 10, a rubber composition containing rich natural rubber that can exhibit excellent adhesiveness may be employed, for example.

The bead portion 4, in the present embodiment, includes the bead outer surface 4a, a bead bottom surface 4b connected with the bead outer surface 4a and being in contact with a respective one of the rim seats Ra of the rim R, and a bead inner surface 4c connected to the bead bottom surface 4b and being not in contact with the rim R.

The bead outer surface 4a according to the present embodiment is located outwardly in the tyre radial direction with respect to the bead base line BL and extends in the tyre radial direction. Note that the bead base line BL is a tyre axial line that passes a location of the rim diameter Da of the standard wheel rim R (see JATMA). The bead outer surface 4a, for example, is a surface that is in contact with a one of the flanges Rb of the rim R.

The bead bottom surface 4b according to the present embodiment is a surface of the bead portion 4 defined between a bead toe 13 and a bead heel 14. The bead toe 13 is defined as an innermost end of the tyre radial and axial directions of the bead portion 4. The bead heel 14, in a normal state of the tyre 1, is an intersection of an outer surface of the tyre 1 and the bead base line BL. The bead bottom surface 4b, for example, is inclined outwardly in the tyre radial direction from the bead toe 13 toward the bead heel 14. The bead bottom surface 4b, in the present embodiment, includes a circular arc shape portion that is convex inwardly smoothly in the tyre radial direction.

As used herein, the "normal state" is such that the tyre 1 is mounted onto the standard wheel rim R with a standard pressure but loaded with no tyre load.

As used herein, the "standard pressure" is a standard pressure officially approved for each tyre by standards organizations on which the tyre is based, wherein the standard pressure is the "maximum air pressure" in JATMA, the maximum pressure given in the "Tyre Load Limits at Various Cold Inflation Pressures" table in TRA, and the "Inflation Pressure" in ETRTO, for example.

The bead inner surface 4c, for example, extends outwardly in the tyre radial direction from the bead toe 13 to form the cavity surface 1b of the tyre 1.

The pair of bead portions 4 has a bead base diameter D being less than 99.7% of the rim diameter Da of the standard wheel rim R. This, especially, can increase tightening force between the bead portions 4 and the standard wheel rim R to prevent air from leaking between them. As used herein, the bead base diameter D, in each bead portion 4, is defined as a diameter at an intersection P of a tyre radial line y and a surface of the bead portion 4. The tyre radial line y passes through a position located in a distance of 1.5 mm inwardly in the tyre axial direction away from an intersection point of the bead outer surface 4a and a tyre axial line that passes a middle-height position 5h of the bead core 5 in the tyre radial direction.

When the bead base diameter D is excessively smaller than the rim diameter Da, mountability, which is the ease of work when assembling the rim, may deteriorate. Thus, the bead base diameter D is preferably equal to or more than 99.4% of the rim diameter Da.

In the present embodiment, the inner liner 9 comprises an innermost end 9i in the tyre radial direction located inwardly of a core innermost end 5i in the tyre radial direction of the bead core 5. Thus, leakage of air passing through under each bead core 5 is suppressed. In the present embodiment, also in the bead portion 4 on the right side, the innermost end 9i of the inner liner 9 is located inwardly in the tyre radial direction rather than the core innermost end 5i of the bead core 5.

In each bead portion 4, the innermost end 9i of the inner liner 9, in the present embodiment, forms the bead toe 13. Thus, air leakage through under the bead core 5 is further suppressed. The innermost end 9i of the inner liner 9 is not limited to the one located at the bead toe 13.

In each of the pair of bead portions 4 according to the present embodiment, the inner liner 9 includes a first extension member 15 that extends outwardly in the tyre axial direction through inwardly of the bead core 5 in the tyre radial direction. Thus, air leakage through under the bead core 5 is further suppressed. The first extension member 15, for example, may extend outwardly in the tyre axial direction with respect to a middle-width position 5c of the bead cores 5 in the tyre axial direction.

The first extension member 15, in the present embodiment, extends outwardly in the tyre axial direction with respect to a core outermost end 5a of the bead core in the tyre axial direction. Thus, the above-mentioned effect can further be improved. The first extension member 15 according to the present embodiment forms the bead bottom surface 4b. Further, the first extension member 15, for example, extends to the bead heel 14.

The inner liner 9, for example, may further include a second extension member 16 that extends outwardly in the tyre radial direction from the first extension member 15. In the present embodiment, an outermost end 16e in the tyre radial direction of the second extension member 16 is located outwardly in the tyre radial direction of the bead base line BL.

The second extension member 16, for example, forms a part of the bead outer surface 4a. Thus, the above-mentioned effect can further be improved. It is preferable that the outermost end 16e in the tyre radial direction of the second extension member 16, for example, is located outwardly in the tyre radial direction of a middle-height position 5h of the bead core 5 in the tyre radial direction.

Figure 3:
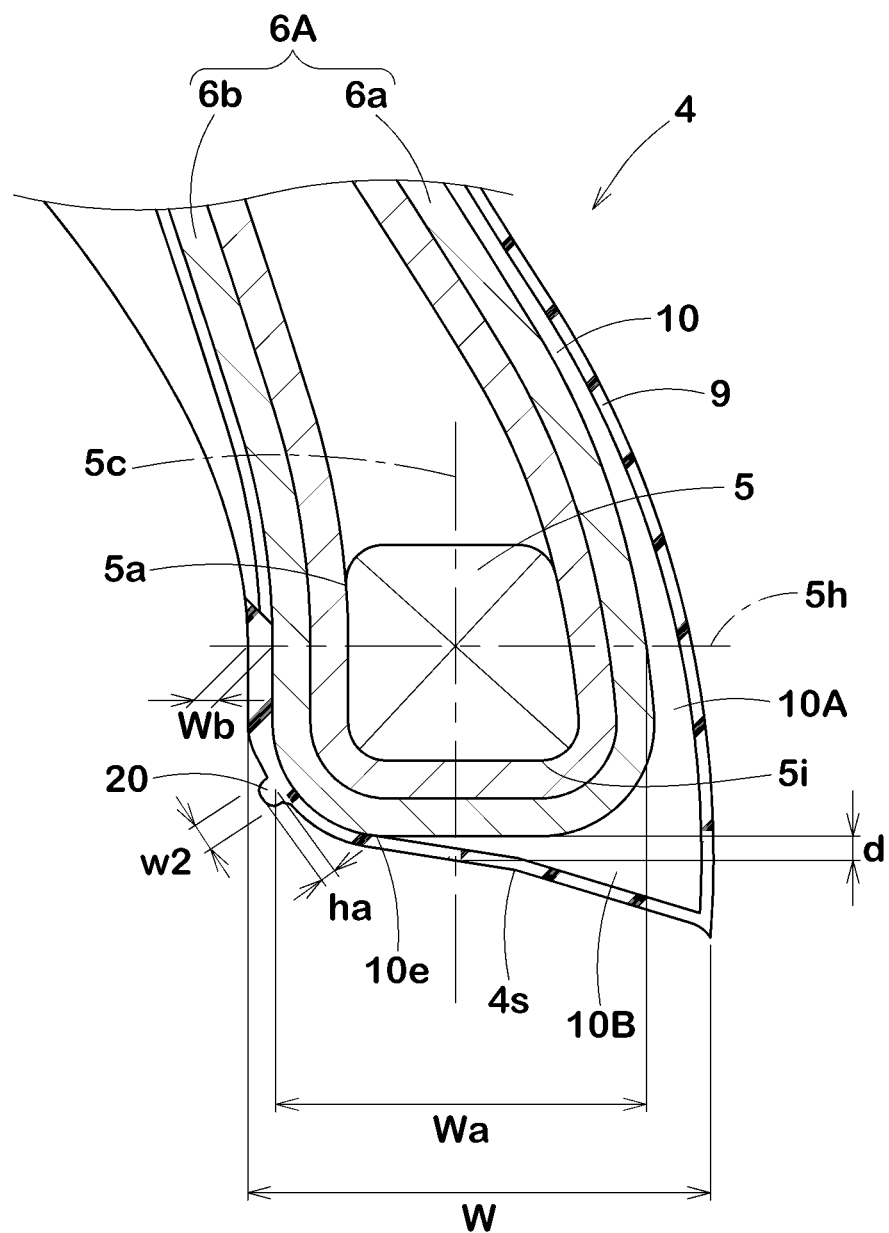

FIG. 3 also illustrates an enlarged view of the left-side bead portion 4. As illustrated in FIG. 3, the tie gum layer 10, in the present embodiment, includes a base portion 10A extending along the main portion 6a of the carcass 6 in a toroidal manner, and a pair of outer portions 10B connected to the base portion 10A and extending along the respective turn-up portions 6b.

The base portion 10A of the tie gum layer 10, in the present embodiment, extends inwardly in the tyre radial direction with respect to the core innermost end 5i of the bead cores 5. Each outer portion 10B of the tie gum layer 10, in the present embodiment, extends outwardly in the tyre axial direction with respect to the middle-width position 5c of the bead cores 5 in the tyre axial direction. An outermost end 10e in the tyre axial direction of the outer portion 10B, for example, is located inwardly in the tyre axial direction with respect to the core outermost end 5a of the bead core 5 in the tyre axial direction.

In each of the pair of bead portions 4, a ratio W/Wa is preferably equal to or more than 1.20, where "W" represents the maximum thickness in the tyre axial direction of the bead portion 4, and "Wa" represents a carcass thickness at the middle-height position 5h of the bead core 5. Such bead portions 4 can inhibit tightening force between the bead portions 4 and the standard wheel rim R from increasing excessively, thus improving mountability to the rim R. When the ratio W/Wa becomes excessively large, the tightening force tends to lower, and thus it may be difficult to suppress leakage of air from between the bead portions 4 and the rim R. Hence, the ratio W/Wa is preferably equal to or less than 2.50, more preferably equal to or less than 2.0, still further preferably equal to or less than 1.50. Note that the carcass thickness Wa, in each bead portion 4, is an axial distance from an inner surface in the tyre axial direction of the main portion 6a to an outer surface in the tyre axial direction of the turn-up portion 6b at the middle-height position 5h of the bead core 5.

At the middle-height position 5h of each bead core 5, a ratio W/Wb is preferably greater than 4.50. Here, "W" represents the maximum thickness in the tyre axial direction of the bead portion 4, and "Wb" represents an axial thickness from an outer surface of the turn-up portion 6b to an outer surface of the bead portion 4 in the tyre axial direction.

Thus, the bead cores 5 can be arranged outwardly in the tyre axial direction in the respective bead portions 4. Normally, the rim seats Ra, toward outward in the tyre axial direction, are inclined outwardly in the tyre radial direction. Thus, the more the bead cores 5 are arranged outwardly in the portion tyre axial direction, the smaller a distance in the tyre radial direction between the rim R and the respective bead cores 5. Therefore, the tightening force therebetween can be larger so as to improve the air leak resistance.

In the present embodiment, rubber that forms the thickness Wb is the inner liner 9. From the point of view of preventing air leakage through the inner liner 9, the thickness Wb is preferably equal to or more than 0.5 mm.

In each bead portion 4, a radial thickness (d) at the middle-width position 5c of the bead core 5 in the tyre axial direction, from an inner surface in the tyre radial direction of the turn-up portion 6b to the bead inner surface 4b of the bead portion 4 in the tyre radial direction is preferably in a range of 2 to 5 mm. Thus, the mountability and air leak resistance can be improved in a well-balanced manner. The radial thickness (d) portion, for example, is formed of the inner liner 9 and the tie gum layer 10.

Each bead portion 4, in the present embodiment, includes a protrusion 20 protruding outwardly from a bead reference surface 4s. Such a protrusion 20 can generate localized large contact pressure against the rim R and increases the tightening force between the bead portions 4 and the rim R, effectively preventing air leakage from between them. The protrusion 20, in the present embodiment, is formed of the inner liner 9.

The protrusion 20, for example, extends continuously in the tyre circumferential direction. As illustrated in FIG. 3, the protrusion 20, in the present embodiment, is formed into a circular arc shape (e.g., a semicircular arc shape). However, the protrusion 20 is not limited to this shape, for example, it can also be triangular or rectangular shape. The bead reference surface 4s is a surface of the bead portion 4. However, as to the location where the protrusion 20 is provided, the bead reference surface 4s is defined as an imaginary profile of the bead portion 4 when no protrusion is provided. To obtain the imaginary profile, one or more circular arcs having a radius of curvature equal to or more than 3 mm and/or a straight line may be used to define the bead bottom surface 4b or the bead outer surface 4a.

The protrusion 20 is located outwardly in the tyre axial direction of the middle-width position 5c of the bead core 5 in the tyre axial direction and inwardly in the tyre radial direction of the middle-height position 5h of the bead core in the tyre radial direction. Such a protrusion 20 may receive large tightening force from the bead core 5, improving the air leak resistance further.

The protrusion 20, for example, is located inwardly in the tyre radial direction of the core innermost end 5i and outwardly in the tyre axial direction of the core outermost end 5a. Thus, the above-mentioned effect can further be improved.

Although it is not particularly limited, the protrusion 20 preferably has a maximum height ha from the bead reference surface 4s being 2% to 6% of the maximum thickness W of the bead portion 4. The width w2 of the protrusion 20 is preferably in a range of 70% to 150% of the maximum height ha.

The protrusion 20 contacts the flange Rb in the present embodiment. Generally, the load acting on the flange Rb is smaller than that on the rim seat Ra. Thus, by arranging the protrusion 20 so as to contact with the flange Rb, positional deviation in the tyre circumferential direction between the tyre 1 and the rim R that occurs during traveling (hereinafter referred to as "rim slip") can be suppressed.

While the particularly preferable embodiments in accordance with the present disclosure have been described in detail, the present disclosure is not limited to the illustrated embodiments, but can be modified and carried out in various aspects within the scope of the claims.

Example

Motorcycle tyres having the basic structure shown in FIG. 1 were manufactured by way of trial based on the detail shown in Table 1. Then, tests were conducted on air leak resistance, mountability and rim slip resistance of each test tyre. The test method is as follows. Note that in Table 1, "outside" and "inside" of "inner end positions of the inner liner" means that the inner ends of the tyre radial direction of the inner liner are located "inward" and "outward" of the radially inner ends of the respective bead cores, respectively.
Tyre size: 120/70R17
Rim size: 3.50 MT
Air Leak Resistance Test:
  After the test tyre were mounted onto regular rims, they were left for 3 months in a room under the following conditions, and then air pressure of the tyres were measured.
  Room temperature: 25 degrees. C.
  Initial air pressure: 250 kPa
  Load: 0 N
  The test results are indicated as an index with the air pressure of Ref 1 as 100, and the larger the value, the better the air leak resistance.
Mountability Test:
  When mounting each test tyre onto the standard wheel rim, the pressure (mounting pressure) that the bead portion gets over the hump of the standard wheel rim was measured. The results are indicated as an index with the pressure of Ref 1 being 100, and the smaller the value, the better the mountability.
Rim Slip Test:
  Each test tyre was run on a simulated road surface of a drum tester under the following conditions:
  Mileage: 20,000 km;
  Internal pressure: 250 kPa;
  Load: 80% of the standard tyre load; and
  Speed: 150 km/h.
  Then, it was confirmed with the naked eyes of a tester whether or not the test tyres and the rim were misaligned. The results are indicated as "none" for test tyres with a displacement of 3% or less and as "occurred" for test tyres with a displacement of more than 3%.

As a result of the tests, the example tyres have better air leak resistance and better rim slip than the comparative test tyres. Furthermore, the test tyre maintains better mountability than the comparative test tyres.

What is claimed is:

1. A pneumatic tyre and rim assembly comprising:
a pneumatic tyre and a standard wheel rim on which the pneumatic tyre is mounted, wherein the pneumatic tyre comprises:
a pair of bead portions having respective bead cores therein, each bead core defining a core innermost end in a tyre radial direction and a core outermost end in a tyre axial direction;
an inner liner having an air-impermeable property and extending between the pair of bead portions; and
a carcass ply comprising a main portion extending between the bead cores of the pair of bead portions, and a pair of turn-up portions turned up around the respective bead cores from axially inside to outside of the tyre,
wherein
in each of the pair of bead portions, the inner liner comprises an innermost end in the tyre radial direction located inwardly of the core innermost ends in the tyre radial direction,
the pair of bead portions has a bead base diameter being less than 99.7% of a rim diameter of the standard wheel rim,
in at least one of the pair of bead portions, the inner liner comprises a first extension member that extends outwardly in the tyre axial direction through inwardly of the bead core in the tyre radial direction and a second extension member,
the first extension member of the inner liner extends beyond the core outermost end outwardly in the tyre axial direction,
the second extension member extends outwardly in the tyre radial direction from an axially outer end of the first extension member,
an outermost end in the tyre radial direction of the second extension member of the inner liner is located outwardly in the tyre radial direction of a bead base line,
the second extension member is exposed at an axially outer end of an outer surface of the at least one of the pair of bead portions,
in a radially inner region of the bead core in the at least one of the pair of bead portions, a tie gum layer is disposed between the first extension member of the inner liner and the carcass ply,

TABLE 1

|  | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| D/Da (%) | 99.8 | 99.6 | 99.7 | 99.6 | 99.4 | 99.6 | 99.6 | 99.6 | 99.6 | 99.6 | 99.6 | 99.6 |
| Inner end positions of inner liner | outside | outside | inside | inside | inside | inside | inside | inside | inside | inside | inside | inside |
| W/Wa (%) | 1.20 | 1.20 | 1.20 | 1.20 | 1.20 | 1.40 | 1.10 | 1.20 | 1.20 | 1.20 | 1.20 | 1.20 |
| W/Wb (%) | 4.5 | 4.5 | 4.5 | 4.5 | 4.5 | 4.5 | 4.5 | 5.0 | 4.0 | 4.5 | 4.5 | 4.5 |
| d (mm) | 3.5 | 3.5 | 3.5 | 3.5 | 3.5 | 3.5 | 3.5 | 3.5 | 3.5 | 5.5 | 5.0 | 2.0 |
| Air leak resistance [index: Larger is better] | 100 | 100 | 110 | 115 | 120 | 110 | 120 | 120 | 110 | 110 | 115 | 120 |
| Mountability [index: Larger is better]" | 100 | 100 | 100 | 100 | 105 | 95 | 105 | 105 | 95 | 95 | 100 | 105 |
| Rim slip | occurred | none | none | none | none | none | none | none | none | none | none | none | the tie gum layer extends outwardly in the tyre axial direction with respect to a middle-width position of the bead core in the tyre axial direction, and an outermost end in the tyre axial direction of the tie gum layer is located inwardly in the tyre axial direction with respect to the core outermost end of the bead core in the tyre axial direction.

2. The pneumatic tyre and rim assembly according to claim 1, wherein the pneumatic tyre is a motorcycle tyre that has a tread width in the tyre axial direction corresponding to a tyre maximum width.

3. The pneumatic tyre and rim assembly according to claim 1, wherein
in each of the pair of bead portions, a ratio W/Wa is equal to or more than 1.20, where "W" represents a maximum thickness in the tyre axial direction of the bead portion, and "Wa" represents a carcass thickness from an inner surface in the tyre axial direction of the main portion to an outer surface in the tyre axial direction of the turn-up portion at a middle-height position of the bead core in the tyre radial direction.

4. The pneumatic tyre and rim assembly according to claim 3, wherein a thickness in the tyre radial direction at a middle-width position of the bead core in the tyre axial direction from an inner surface in the tyre radial direction of the turn-up portion to an inner surface of the bead portion in the tyre radial direction is in a range of 2 to 5 mm.

5. The pneumatic tyre and rim assembly according to claim 3, wherein in each of the pair of bead portions, a ratio W/Wb is greater than 4.50, where "Wb" represents an axial thickness in the tyre axial direction from the outer surface of the turn-up portion to an outer surface of the bead portion at the middle-height position.

6. The pneumatic tyre and rim assembly according to claim 5, wherein a thickness in the tyre radial direction at a middle-width position of the bead core in the tyre axial direction from an inner surface in the tyre radial direction of the turn-up portion to an inner surface of the bead portion in the tyre radial direction is in a range of 2 to 5 mm.

7. The pneumatic tyre and rim assembly according to claim 1, wherein
the pair of bead portions each comprises a protrusion protruding outwardly from a bead reference surface, and the protrusion is located outwardly in the tyre axial direction of a middle-width position of the bead core in the tyre axial direction and inwardly in the tyre radial direction of a middle-height position of the bead core in the tyre radial direction.

8. The pneumatic tyre and rim assembly according to claim 7, wherein the protrusion is located inwardly in the tyre radial direction of the core innermost end and outwardly in the tyre axial direction of a core outermost end of the bead core in the tyre axial direction.

9. The pneumatic tyre and rim assembly according to claim 8, wherein the protrusion extends continuously in a tyre circumferential direction.

10. The pneumatic tyre and rim assembly according to claim 7, wherein the protrusion has a maximum height (ha) from a bead reference surface being 2% to 6% of a maximum thickness W of the bead portion and a width (w2) being in a range of 70% to 150% of the maximum height (ha).

11. The pneumatic tyre and rim assembly according to claim 10, wherein the protrusion has a semicircular cross-sectional shape.

12. The pneumatic tyre and rim assembly according to claim 11, wherein the protrusion protrudes so as not to be beyond a radial line that passes a bead outer surface of the respective one of the pair of bead portions.

* * * * *